United States Patent [19]
Dennis et al.

[11] 4,248,087
[45] Feb. 3, 1981

[54] SYSTEM AND METHOD FOR DETERMINING FLUID LEVEL IN A CONTAINER

[75] Inventors: John R. Dennis; Harold D. Fish, both of Duncan, Okla.

[73] Assignee: Halliburton Company, Duncan, Okla.

[21] Appl. No.: 67,844

[22] Filed: Aug. 16, 1979

[51] Int. Cl.³ .............................................. G01F 23/28
[52] U.S. Cl. ................................. 73/290 V; 340/621
[58] Field of Search ............... 73/290 V, 597, 1 H; 340/621, 618

[56] References Cited

U.S. PATENT DOCUMENTS

| | | | |
|---|---|---|---|
| 2,990,543 | 6/1961 | Rod | 73/290 V X |
| 3,019,650 | 2/1962 | Worswick | 73/290 V |
| 3,220,258 | 11/1965 | Rod | 73/290 V |
| 3,603,149 | 9/1971 | McKown | 73/290 V |
| 4,118,983 | 10/1978 | Brazhnikov | 73/290 V |

FOREIGN PATENT DOCUMENTS

| | | | |
|---|---|---|---|
| 2323988 | 4/1977 | France | 73/290 V |
| 809681 | 3/1959 | United Kingdom | 340/621 |
| 1531729 | 11/1978 | United Kingdom | 73/290 V |
| 422967 | 9/1974 | U.S.S.R. | 73/290 V |
| 537253 | 12/1976 | U.S.S.R. | 73/290 V |

*Primary Examiner*—Gerald Goldberg
*Assistant Examiner*—Joseph W. Roskos
*Attorney, Agent, or Firm*—John H. Tregoning; William J. Beard

[57] ABSTRACT

Methods and systems employing acoustic techniques are disclosed for determining the level of fluid in a container. Flexural mode acoustic waves are set up in the walls of the container. The change in travel time of flexural mode acoustic waves are measured and calibrated in terms of the level of fluid in the container. Systems for continuously monitoring fluid level or indicating when fluid level reaches a predetermined horizontal level are disclosed.

20 Claims, 4 Drawing Figures

SYSTEM AND METHOD FOR DETERMINING FLUID LEVEL IN A CONTAINER

BACKGROUND OF THE INVENTION

This invention relates to methods and apparatus for sensing the level of a fluid, either solid particulate or liquid, in an enclosed container or tank. More particularly, the invention relates to such a tank level indicator system employing the ultrasonic transmission of acoustic of vibratory energy for indicating fluid level.

In oil field fracturing and cementing operations large tanks or containers of fluids are connected to high pressure mixing and pumping systems. Such pumping systems are used to inject the fluids, or mixtures thereof, under pressures ranging up to 25,000 psi into a wellbore or earth formations surrounding a well borehole. Fluids from a battery of multiple tanks may be pumped in parallel to mixing apparatus or to high pressure staging pumps for injection into the subsurface environment. The fluids in different ones of the multiple tanks may be utilized at different rates in the mixing or pumping apparatus. The tanks will not empty at the same rate during such an operation. It is extremely important in such operations to know the level of fluid in a given tank at any instant of time. Catastrophic failures of high pressure pumping apparatus can occur if a tank is completely emtpied unknowingly, and the high pressure pump allowed to suck air into the system.

It will be appreciated by those skilled in the art, that various fluids, both solid and liquid, and some of which may be of a non-Newtonian nature can be utilized in oil well fracturing and cementing operations. Froths or foams may accumulate on the surface of such liquid materials in tanks awaiting usage in such operations. Similarly, bubbles of air or gas may be present in the fluid. It will also be appreciated by those skilled in the art, that extreme vibratory or acoustic noise exists in such environment due to the energy dissipated by pump motors and heavy equipment in the vicinity. All of these factors combine to provide a very hostile environment in which measurements of the fluid level in a tank must be satisfactorily made.

Attempts to measure the fluid level in such tanks by the use of sight glasses or floating mechanical indicators have proven to be unreliable. The present invention, by use of ultrasonic transmitting and receiving apparatus which may be applied to the exterior surface of a tank, provides a system which can accurately monitor the level of fluid inside the tank under the hostile environmental conditions present in oil field operations. The present invention provides a unique and accurate approach to the measurement of fluid levels in a tank by use of the propagation velocity of acoustic or ultrasonic energy in the walls of such a tank.

DESCRIPTION OF THE PRIOR ART

Several types of sonic or ultrasonic transducer systems have been used for measuring the level of liquids in tanks in the prior art. A first type of liquid level gauge of the acoustic or ultrasonic type used in the prior art comprises a single transducer installed near the top of a tank. The transducer sends out a burst of ultrasonic energy directed downwardly which is partially reflected at the interface between the air and the fluid in the tank. The time from the initiation of the acoustic energy pulse until the reception of the reflected pulse is measured. This two way travel time is converted to a distance from the known propagation velocity in air and thus provides an indication of the liquid level in the tank. Similarly, such an acoustic transducer could be mounted at the bottom of the tank and could emit an energy pulse which is directed upwardly through the fluid and reflected at the liquid-air interface at the surface of the fluid level in the tank. A portion of the reflected energy pulse returns to the transducer. Again, the time of propagation for the pulse to travel from the transducer to the interface and return is measured. This two way travel time may be converted to liquid level in the tank, provided the velocity of propagation in the fluid is accurately known. Unfortunately, for either type of such systems foam on the surface of the fluid in the tank can absorb and dissipate the pulse. Temperature changes (and corresponding density changes of the fluid) in the tank can destroy the accuracy of such reflective two way travel time measuring system.

A second type of acoustic measurement of level in a tank is provided by a system comprising a transmitter near the bottom of one side of a tank and multiple acoustic receivers mounted on the other side of the tank. The acoustic transmitter is activated and the amplitude of signals at the receivers on the opposite of the tank is indicative of the level at which the fluid resides in the tank. This type of system can only provide information as to whether the fluid level is between a particular pair of transducers at any instant of time. Unfortunately, for this and all other amplitude measurement systems, such systems have proven not to be as accurate as desirable in oil field operations because of the high background or ambient noise level of acoustic energy present near the vicinity of a well in oil field operations. Similarly the presence of air or gas in the fluid dissipates the acoustic energy, again destroying the accuracy of such systems.

A third type of ultrasonic liquid level indicating systems, comprises a number of pulse echo type transmitting receiving transducers placed down one side of a tank in a vertical line. Each transducer is activated in turn, and the amplitude of the acoustic signals sent inwardly normal to the tank wall surface and reflected from the interior wall of the tank back into the transducer (i.e. the Q of the system), provides an indication of whether fluid is present in the tank at the height of a particular transducer which has been activated. Such systems suffer from the shortcomings in oil field operations present will all amplitude sensitive systems. That is, the high ambient noise level in such oil field operations can destroy the accuracy of such a system. In addition, this system only quantifies the level of fluid in the container to the degree of accuracy of the spacing of the transducers. It would be highly desirable to provide more accurate level information and at the same time use a smaller number of acoustic transducers in the operation.

U.S. Pat. Nos. 3,603,149, 3,220,258, _,990,543, and 3,019,650 together with U.S.S.R. Pat. Nos. 422,967 and 537,253 typify systems using acoustic or ultrasonic measurement techniques which are known in the prior art.

BRIEF DESCRIPTION OF THE INVENTION

The tank level indicator system of the present invention in a preferred embodiment utilizes a single ultrasonic transmitting transducer and a single ultrasonic receiving transducer which are coupled to the external wall of a tank in which a fluid resides whose level is to be monitored. The coupling of the transducer elements to the wall of the tank may be provided, for example, by magnetic attachment. Mechanical clamping or adhesive clamping of the transducers to the side of the tank could also be employed, if desired. The transducers are oriented with the direction of propagation of the ultrasonic energy being normal to the tank surface. The transmitting transducer is activated and emits a burst of acoustic or ultrasonic energy into the wall of the tank. The firing of the transmitter causes various modes of acoustic energy propagation to be excited in the walls of the tank. One such mode is a flexural mode of the tank wall. The velocity at which this acoustic wave packet travels is dependent on the mass loading of the material contained in the tank. The flexural mode burst of acoustic energy is detected by the receiving transducer and the travel time of the acoustic energy bursts from the transmitter to the receiver is determined. As the liquid level varies in the tank the mass loading on the wall of the tank will vary and the travel time of the acoustic energy from the transmitter to the receiver will vary correspondingly. Thus, by detecting the change in travel time of the acoustic energy from the transmitter to the receiver as the liquid level varies in the tank, the level may be monitored accurately. The system may be calibrated prior to use for different fluids contained within the tank. It will be appreciated by those skilled in the art, that the density of the fluid in the tank can affect the mass loading and hence the propagation travel time from transmitter to receiver. Thus, the calibration of travel time change versus fluid level will, in general, be different for fluids of different densities.

Alternatively, in another embodiment of the invention, two receivers may be placed a short vertical distance apart from each other near the top of the tank. As the liquid level falls below the lower of the two receivers which are spaced a known distance apart, the tank calibration may be achieved in operation in real time.

In yet another embodiment of the invention, the transmitter and receiver transducers are spaced a short horizontal distance apart and both located in a horizontal line near the bottom, or empty level, of the tank. In this embodiment a rapid change in the travel time of acoustic energy from a transmitter to the receiver is obtained when the fluid level inside the tank reaches the horizontal level of the transmitter-receiver pair. In this embodiment, the system of the present invention could be utilized to monitor the passage of the fluid level inside the tank as it passes a predetermined horizontal level. It will be appreciated by those skilled in the art that this level could be any horizontal level on the tank as desired.

DESCRIPTION OF THE PREFERRED EMBODIMENTS

The tank level indicator system of the present invention operates on the principle that ultrasonic energy transmitted in the steel walls comprising the side of a tank containing a fluid whose level is to be measured, will transmit the acoustic energy with at least some of the energy coupled to the tank wall in a flexural mode of transmission. The ability of the tank walls to flex is a function of the internal loading of the walls by the fluid filling the tank. Thus, the travel time of acoustic energy propagating from a transmitter to a receiver is decreased as the loading on the wall of the tank is decreased or as the fluid level in the tank goes down.

Figure 1:
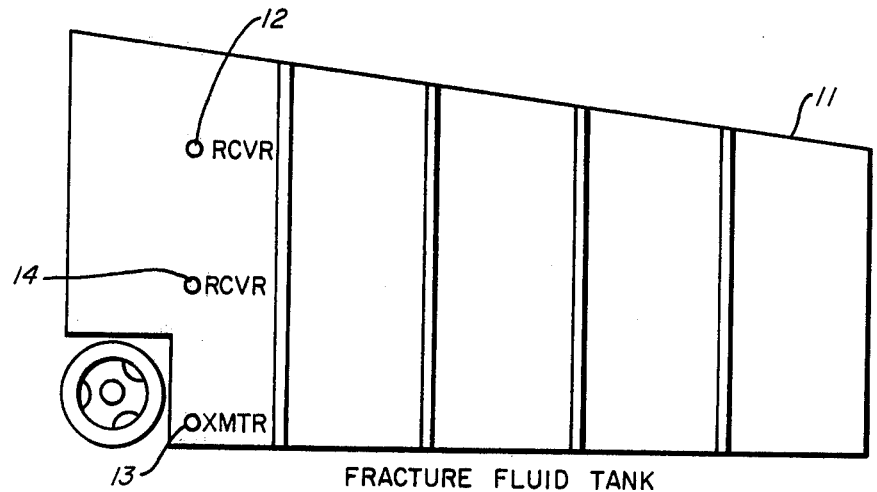
FIG. 1 illustrates schematically a typical oil field fracture operation tank and depicts the location of transmitting and receiving transducers thereon, according to the invention.

Referring initially to FIG. 1, a fracture fluid tank 11 sized and shaped in the manner typically for containing a fluid used during a well fracturing job is illustrated schematically. A transmitting transducer 13 which will be described in more detail subsequently, is magnetically attached to the outer wall of the tank 11 near the bottom portion thereof. A receiving transducer 12 which will also be described in more detail subsequently, is magnetically attached to the wall of the tank 11 near the top portion thereof. In the embodiment shown in FIG. 1 an optional receiving transducer 14 is shown magnetically attached to the wall of the tank 11 at a point just below that of receiving transducer 12 and transmitting transducer 13. In the configuration illustrated in FIG. 1 the transmitting transducer is fired in a pulsed mode of operation. This generates a flexural acoustic wave at ultrasonic frequency which propates along the wall of the fracture fluid tank 11, toward the receiving transducers 12 and 14. The electronic system of the present invention detects the arrival of the flexural mode wave at each of the receiving transducers 12 and 14 and computes the travel time $\Delta T$ of the wave from the transmitting transducer 13 to each of the receiving transducers.

Transmitting and receiving transducers 12, 13 and 14 each comprise piezoelectric ceramic elements which are enclosed in a tubular metallic body member. A ceramic magnet at one end of the body member is used to firmly and securely attach the transmitting and receiving transducer elements to the wall of the fracture fluid tank 11. An electronic control and measurement system such as that illustrated in FIG. 3 (to be described in more detail subsequently) is utilized to activate the transmitter and to determine the travel time of the flexural mode acoustic wave from the transmitter to the receiving transducers.

Figure 4:
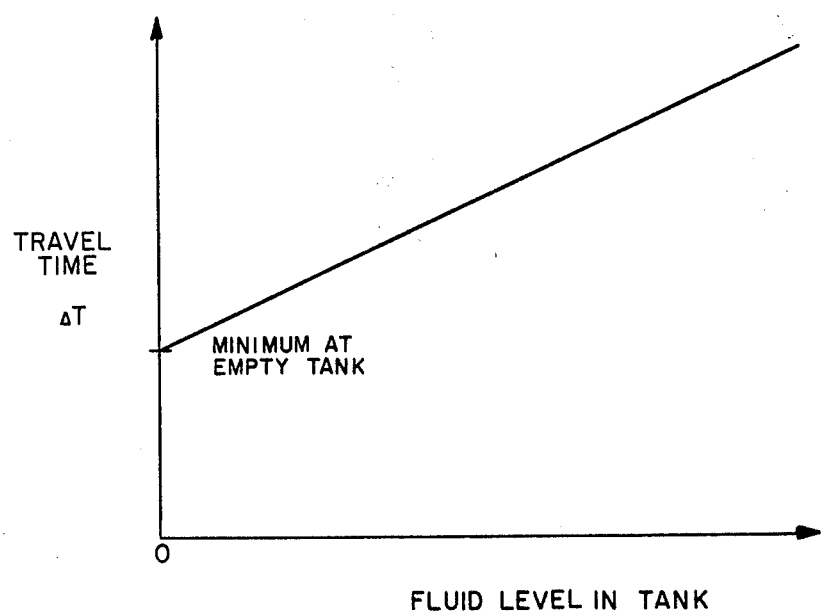

Referring now to FIG. 4, the relationship between the acoustic wave travel time $\Delta T$, from the transmitting transducer to a receiving transducer, and the fluid level in a tank such as that illustrated in FIG. 1, is shown graphically. The relationship is nearly linear and is a function of the density of the fluid contained in the tank. For fluids common in use in well fracturing operations, the slope of the linear relationship illustrated in FIG. 4 can vary from about 1.25 microseconds per inch of fluid level change to approximately 1.65 to 1.7 microseconds per inch of fluid level change in the tank. This slope varies as a function of the fluid density.

Figure 2:
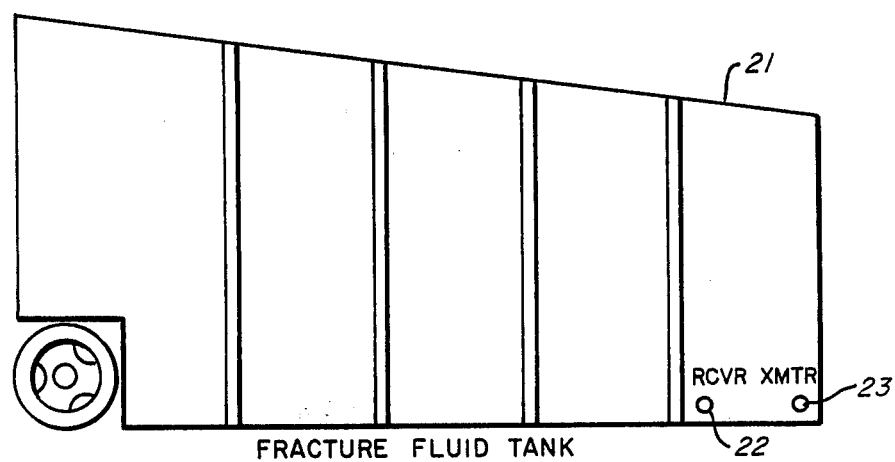
FIG. 2 illustrates a second positioning of transducers on a fracture tank for use in oil field operations, according to the invention.

Referring now to FIG. 2, a second arrangement of receiving and transmitting transducers in accordance with the present invention is illustrated schematically. In FIG. 2 a fracture fluid tank 21 has affixed to the exterior surface thereof, in horizontal alignment, near the bottom portion thereof, a transmitting transducer 23 and a receiving transducer 22. These transducers may comprise piezoelectric ceramic transmitting and receiving elements as previously described. The transducers are securely attached to the side of the fracture fluid tank 21 by magnetic clamping means as previously described. It will be appreciated by those skilled in the art however, that should it be desired, the transducer elements could be permanently affixed to the sides of the tank such as by screw mounting or adhesive mounting in a permanent fashion. For a portable measurement system however, attachment by the magnets is secure enough for the purposes of the present invention. In the system illustrated in FIG. 2, the transmitting transducer is activated periodically and the travel time of the flexural mode acoustic wave from the transmitting transducer 23 to the receiving transducer 22 is measured. As the fluid level drops in the tank, a sharp change in the velocity of propagation or travel time between the horizontally aligned transmitting and receiving transducers will be observed when the fluid level in the tank drops below the horizontal level at which the transmitter and receiver pair are fixed to the exterior surface. Thus, the present invention may be utilized as either as a calibrated system to measure the fluid level in a tank when calibrated in accordance with a graphical representation such as that illustrated in FIG. 4, or it may be utilized to indicate when the level of fluid in a tank has dropped beneath a particular horizontal level as according to the transducer mounting arrangement illustrated in FIG. 2.

Figure 3:
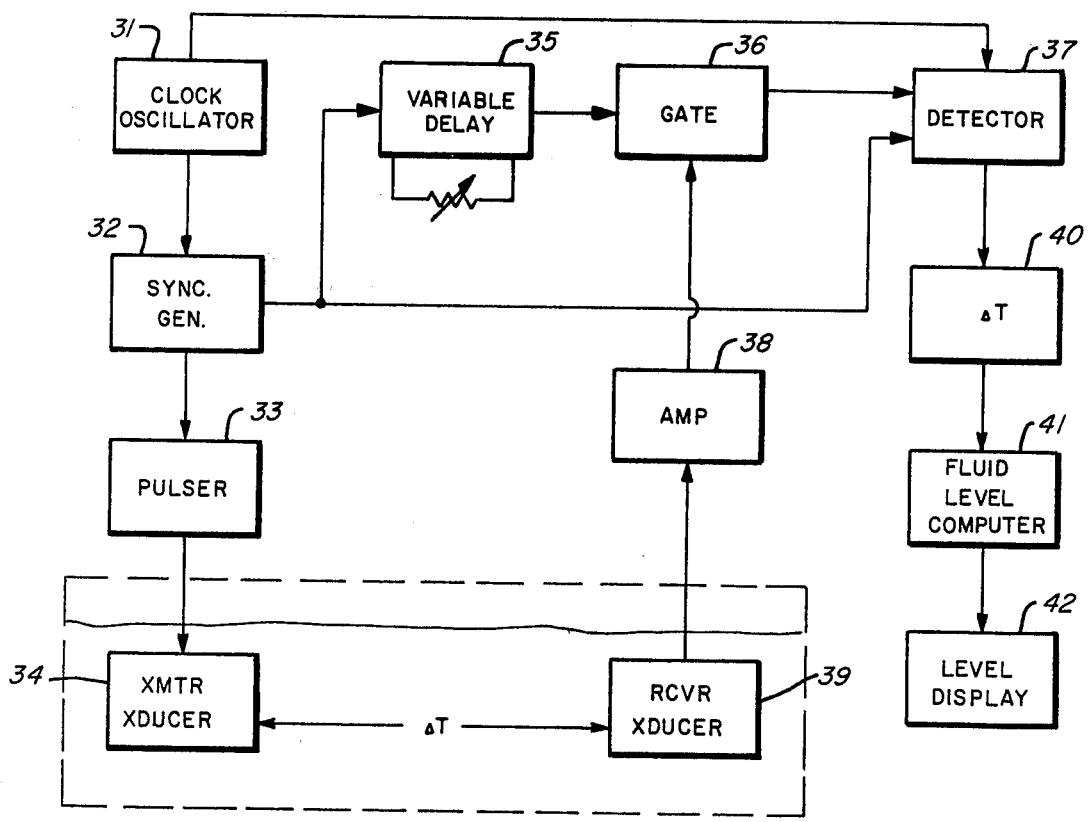
FIG. 3 illustrates schematically in block diagram form, a travel time measuring system in accordance with the invention and, FIG. 4 illustrates graphically, a typical calibration curve depicting the variation of travel time of flexural mode acoustic energy between a transmitter and receiver as a function of fluid level in a tank being monitored.

Referring now to FIG. 3, an electronic system for performing the travel time, or $\Delta T$, measurements of the flexural mode acoustic wave between the transducers according to the concepts of the present invention is illustrated schematically. A clock oscillator 31 which operates at a frequency of approximately 4 megahertz, supplies clocking pulse signals to a sync, or synchronization pulse, generator 32 and also to a detector 37. The sync generator 32, which may comprise a binary shift register or the like, or a succession of binary divide by two counters or the like, operates to periodically produce synchronization pulses upon the occurance of a predetermined number of clock pulses from the clock oscillator 31. For example, the sync generator could provide one output pulse per second. Sync pulses produced by the sync generator 32 are conducted via a variable delay line 35 to a receiver gate 36 and to a detector circuit 37. The sync pulses produced by the sync generator 32 are also conducted to an electrical pulser circuit 33. Pulser circuit 33, upon receipt of a sync pulse, immediately generates a high voltage electrical pulse of square wave shape which is applied to a piezoelectric transmitter transducer 34. Upon application of the voltage pulse from pulser 33 to the transmitting piezoelectric transducer, an acoustic pulse of approximately 25 kilohertz frequency is applied to the side of the tank whose fluid level is to be indicated. The flexural mode acoustic wave induced in the wall of the tank is coupled via the wall to a receiver transducer 39. The receiver acoustic signal is conducted via an amplifier 38 to the receiver gate 36. The gate 36 is a time gate which acts to prevent acoustic signals from the receiving transducer from reaching the detector circuit 37 except during an interval in which such signals are generally expected after the firing of the transmitter transducer. The gate 36 is conditioned via the sync pulse signal delivered to it via variable delay line 35.

Thus the variable delay line 35 may be adjusted to provide a time gate opening portion which occurs only in the general range of times in which it is expected that a signal from the transmitter transducer is arriving at the receiver transducer. This eliminates the background or ambient noise present in the oil field environment of the system from becoming a problem in the detection of the arriving signal from the transmitter.

For example, if the transmitter and receiver are spaced apart approximately 6 feet, then the variable delay line 35 may be adjusted to provide approximately a 900 microsecond delay to allow for the acoustic flexural mode wave to travel along the wall of the fluid tank from the transmitter to the receiver. Only then would gate 36 be conditioned to pass the received signal from the receiver transducer 39 which is amplified via amplifier 38.

Output signals from the gate 36 are applied to the detector 27. It will be recalled that clock signals from the clock oscillator 31 are similarly applied to detector 37. The detector 37 may comprise, for example, a binary counter which is coupled to the clock oscillator 31. The counter is conditioned to begin counting upon receipt of a signal from the sync generator 32. The counter continues to count at the frequency of the oscillator, until the arrival of the acoustic signal from the receiver transducer via gate 36. The arrival of the received flexural mode signal then stops the counter. The count (binary number) remaining therein is a measurement of the travel time of the acoustic signal from the transmitting transducer 34 to the receiving transducer 39. This signal is conducted to a $\Delta T$ or travel time register 40 of FIG. 3 from which it is supplied to a level computer 41.

The level computer 41 may comprise, for example, a small programmable micro processor which has in its memory portion, calibration curves such as that of FIG. 4 for a particular type of fluid and tank. Upon receipt of the $\Delta T$ measurement via register 40, the computer then calculates the change in travel time from the last or previous measured $\Delta T$ of the system. Utilizing this information the computer 31 calibrates the change in travel time in terms of a change in fluid level in the tank. This information is then conducted to a level display means 42. This display means 42 may comprise a meter, an oscilloscope display, or graphical strip chart recorder display as desired.

On the other hand, it will be appreciated by those skilled in the art, that a plurality of such tank level measuring systems could be connected to a single general purpose fluid level computer 41. In this case the computer 41 could comprise a small general purpose digital computer such as a model PDP-11 supplied by Digital Equipment Corp. of Cambridge, Mass. programmed in accordance with calibration charts of the type illustrated in FIG. 4. In such a case the general purpose computer could sample the travel time changes in a plurality of such tanks and could simultaneously display the fluid level in such a plurality of tanks simultaneously in any form desired.

Similarly, it will be appreciated by those skilled in the art that a transmitter and two receiver configuration such as that illustrated in FIG. 1 could be provided with receiver pair 12 and situated a known distance apart, for example 6 inches. In this case the change in travel time occurring when the fluid level drops below the lowermost receiver can be used directly to form a calibration chart such as that illustrated in FIG. 4. In such a case receivers 12 and 14 of FIG. 1 would be coupled to a fluid level computer 41 which was properly programmed to know the distance apart the two transducers were mounted. As the fluid level of the tank drops below the lowermost transducer 14, the abrupt change in travel time would be noted by the fluid level computer 41. Thus, a change in travel time when the fluid level dropped over a known distance (in this example 6 inches) could be used to form a calibration chart of the type illustrated in FIG. 4 in real time.

Similarly, the horizontal transducer array illustrated in FIG. 2 may be utilized to detect the dropping of the fluid level below the horizontal line defined by the alignment of the two transducers. In this case, the travel time between transmitting transducer and receiving transducers 23 and 22, would remain essentially the same until the fluid level in the tank 21 dropped below the line defined by the two transducers 22 and 23. At this time a marked change in the travel time ΔT would be noted by the computer 41. An alarm or other display could then be signalled to the operator of the fluid pumps.

While separate and distinct embodiments of the present invention have been discussed, the above disclosure may make other alternative arrangements according to the concepts of the invention apparent to those skilled in the art. The aim therefore in the appended claims is to cover all such changes and modifications as fall within the true spirit and scope of the invention.

We claim:

1. A system for measuring the level of fluid in a container tank comprising:
    at least one acoustic transmitting transducer attached to an exterior surface of said container;
    at least one acoustic receiving transducer attached to an exterior surface of said container and spaced apart from said transmitting transducer;
    means for exciting said transmitting transducer to emit a burst of acoustic energy into a wall of said container, said burst exciting a flexural mode acoustic wave in said wall;
    means for detecting the travel time of said flexural mode acoustic wave burst from said transmitting transducer to said receiving transducer; and
    means for determining, according to a predetermined relationship, the level of fluid in said container as a function of the travel time of said flexural mode acoustic wave and for providing an output signal indicative thereof.

2. The system of claim 1 wherein said acoustic transducers are attached to the exterior surface of said container by magnetic attachment means.

3. The system of claim 1 wherein said acoustic transmitting transducer operates in an ultrasonic frequency range.

4. The system of claim 3 wherein said transducer operates in the frequency range of 25 kilohertz.

5. The system of claim 1 and further including:
    at least one second different acoustic receiving transducer attached to an exterior surface of said container and spaced apart from said transmitting transducer and spaced a different distance from said transmitting transducer than the first of said at least one receiving transducer, and spaced a known distance from said first receiving transducer;
    means for detecting the difference in travel times of said flexural mode acoustic wave as the fluid level in said container passes the known distance between said first and second receiving transducers; and
    means for forming a calibration relationship in real time from said difference in flexural mode acoustic wave travel times as a function of the fluid level in said container.

6. The system of claim 5 wherein each of said transducers are magnetically attached to the exterior surface of said container.

7. The system of claim 6 wherein said transducers are attached along a vertical line on an exterior surface of said tank.

8. The system of claim 1 wherein said transducers are attached along a vertical line as an exterior surface of said tank.

9. A system for detecting the level of fluid in a container comprising:
    an acoustic transmitting transducer attached to an exterior surface of said container;
    an acoustic receiving transducer attached to an exterior surface of said container in spaced relation to said transmitting transducer, said transducer attachment points defining an approximately horizontal line on an exterior surface of said container;
    means for exciting said transmitting transducer to emit a burst of acoustic energy into a wall of said container, said burst exciting a flexural mode acoustic wave in said wall;
    means for detecting the travel time of said flexural mode acoustic wave burst from said transmitting transducer to said receiving transducer and for generating an output signal representative thereof; and
    means for detecting a sudden change in said output signal, thereby indicating when the level of a fluid in said container passes the level of said approximately horizontal line defined by the placement of said transducers.

10. The system of claim 9 wherein said transducers are magnetically attached to said container.

11. The system of claim 9 wherein said acoustic transmitting transducer operates in an ultrasonic frequency range.

12. The system of claim 11 wherein said transducer operates at a frequency of approximately 25 kilohertz.

13. A method for determining the level of fluid in a container comprising the steps of:
    exciting, in the wall of said container, flexural mode acoustic waves;
    repetitively measuring the travel time of said flexural mode acoustic wave between at least two points on the wall of said container; and
    determining, as a function of changes in said repetitive travel time measurements, the level of fluid in said container.

14. The method of claim 13 wherein said at least two points define an approximately vertical line.

15. The method of claim 13 wherein said at least two points define an approximately horizontal line.

16. The method of claim 13 wherein the step of exciting said flexural mode acoustic waves comprises attaching at least one acoustic transmitting transducer to an exterior surface of said container and pulsing said transducer to emit bursts of acoustic energy which are coupled to the wall of said container and thereby excite flexural mode acoustic waves in said wall.

17. The method of claim 16 wherein said transmitting transducer is magnetically attached to an exterior surface of said container.

18. The method of claim 16 wherein said transducer operates in an ultrasonic frequency range.

19. The method of claim 18 wherein said transducer operates at a frequency of approximately 25 kilohertz.

20. The method of claim 13 wherein the determining step includes determining the change in travel time of said flexural mode acoustic wave over a known distance, thereby calibrating in real time, the change in said flexural mode acoustic wave travel time as a function of fluid level in said container.

* * * * *